(12) United States Patent
Lin et al.

(10) Patent No.: US 11,714,537 B2
(45) Date of Patent: Aug. 1, 2023

(54) TECHNIQUES FOR PROVIDING A SEARCH INTERFACE WITHIN A CAROUSEL

(71) Applicant: Amazon Technologies, Inc., Seattle, WA (US)

(72) Inventors: Yi-Chen Lin, Seattle, WA (US); Shengli Sui, Sunnyvale, CA (US); Yash Anil Belorkar, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/540,591

(22) Filed: Dec. 2, 2021

(65) Prior Publication Data
US 2023/0176722 A1 Jun. 8, 2023

(51) Int. Cl.
*G06F 3/0482* (2013.01)
*G06F 3/0485* (2022.01)
(Continued)

(52) U.S. Cl.
CPC .......... *G06F 3/0485* (2013.01); *G06F 3/0482* (2013.01); *G06F 16/90335* (2019.01); *G06T 11/00* (2013.01); *G06T 2200/24* (2013.01)

(58) Field of Classification Search
CPC ................................................ G06F 3/048–05
See application file for complete search history.

(56) References Cited

U.S. PATENT DOCUMENTS 6,570,594 B1 * 5/2003 Wagner ................. G06F 3/0481
 715/781
8,793,330 B2 * 7/2014 Samuel .............. G06Q 30/0277
 715/825
(Continued)

FOREIGN PATENT DOCUMENTS

WO 2017143337 A1 8/2017

OTHER PUBLICATIONS

Github.com, "Scrollbar indicator #42", archived in wayback machine on Nov. 15, 2020, available at «https://github.com/pawelgrzybek/siema/issues/42», 5 pages (Year: 2020).*
(Continued)

*Primary Examiner* — Daniel Rodriguez
(74) *Attorney, Agent, or Firm* — Kilpatrick Townsend & Stockton LLP

(57) ABSTRACT

Techniques are described herein for providing search features within a carousel. A request may be received to display a network page (e.g., a user profile page). The carousel may present a subset of items of a set of items (e.g., items associated with the user profile). User input indicating a scrolling action within the carousel can be received. In response, a user interface (UI) element associated with conducting a search may be presented in an expanded form overlaid atop the carousel. After a predefined period of time has elapsed, the UI element may transition to a collapsed form. If the UI element is selected, the user may be navigated to the end of the carousel where a statically-positioned presentation of the UI element is presented. A search may be conducted from the statically-positioned presentation. The search may be performed against the set of items associated with the user profile.

20 Claims, 8 Drawing Sheets

(51) Int. Cl.
*G06F 16/903* (2019.01)
*G06T 11/00* (2006.01)

(56) References Cited

U.S. PATENT DOCUMENTS

| | | | | |
|---|---|---|---|---|
| 2004/0103027 A1* | 5/2004 | Yamamoto | ......... | G06Q 30/0264 705/14.54 |
| 2005/0229102 A1* | 10/2005 | Watson | ................. | G06F 3/0481 715/810 |
| 2006/0184901 A1* | 8/2006 | Dietz | .................. | G06F 3/04855 707/E17.093 |
| 2008/0195960 A1* | 8/2008 | Bostock | ................ | G06F 3/0485 715/767 |
| 2010/0231537 A1* | 9/2010 | Pisula | ................ | G06F 3/04883 345/173 |
| 2012/0054669 A1 | 3/2012 | Refuah et al. | | |
| 2012/0167003 A1* | 6/2012 | Johansson | ............ | G06F 3/04883 715/786 |
| 2012/0191577 A1 | 7/2012 | Gonsalves et al. | | |
| 2012/0278725 A1* | 11/2012 | Gordon | ................ | H04N 21/858 715/738 |
| 2013/0208000 A1* | 8/2013 | Uysal | .................. | G06F 3/04847 345/660 |
| 2013/0314446 A1* | 11/2013 | Maekawa | ............... | G06F 3/041 345/684 |
| 2014/0317510 A1* | 10/2014 | Ku | ....................... | G11B 27/031 715/720 |
| 2015/0052485 A1* | 2/2015 | Grounds | ............... | G06F 3/0482 715/830 |
| 2015/0058318 A1* | 2/2015 | Blackwell | ........... | G06F 16/9535 707/722 |
| 2016/0291848 A1* | 10/2016 | Hall | ..................... | G06F 3/04886 |
| 2018/0004405 A1* | 1/2018 | Campbell | ............. | G06F 3/0485 |
| 2018/0197575 A1* | 7/2018 | Doherty | ............. | G06Q 30/0276 |
| 2022/0197393 A1* | 6/2022 | Goodrich | ............ | G06F 3/0482 |
| 2022/0374230 A1* | 11/2022 | Rao | ....................... | G06F 16/221 |

OTHER PUBLICATIONS

"html—How to overlay a searchbox ona carousel?—Stack Overflow", Jan. 1, 2017.
PCT/US2022/049287, "International Search Report and the Written Opinion", dated Mar. 15, 2023, 18 pages.

* cited by examiner

TECHNIQUES FOR PROVIDING A SEARCH INTERFACE WITHIN A CAROUSEL

BACKGROUND

Users often use mobile applications to navigate through electronic catalogs for items available for order. Subsequently, the user may have need to view the order. If the order was made relatively recently, finding the order may be straight forward. However, if the order is old (e.g., over a threshold age such as older than three months, older than six months, not in the top n number of most recent orders, etc.), finding the order again can be time consuming and confusing for the user. The user may end up navigating through various web pages in his attempt to find the order, which wastes computing resources for the electronic catalog provider and may lead to frustration for the user.

BRIEF DESCRIPTION OF THE DRAWINGS

Various embodiments in accordance with the present disclosure will be described with reference to the drawings, in which.

DETAILED DESCRIPTION

Figure 1:
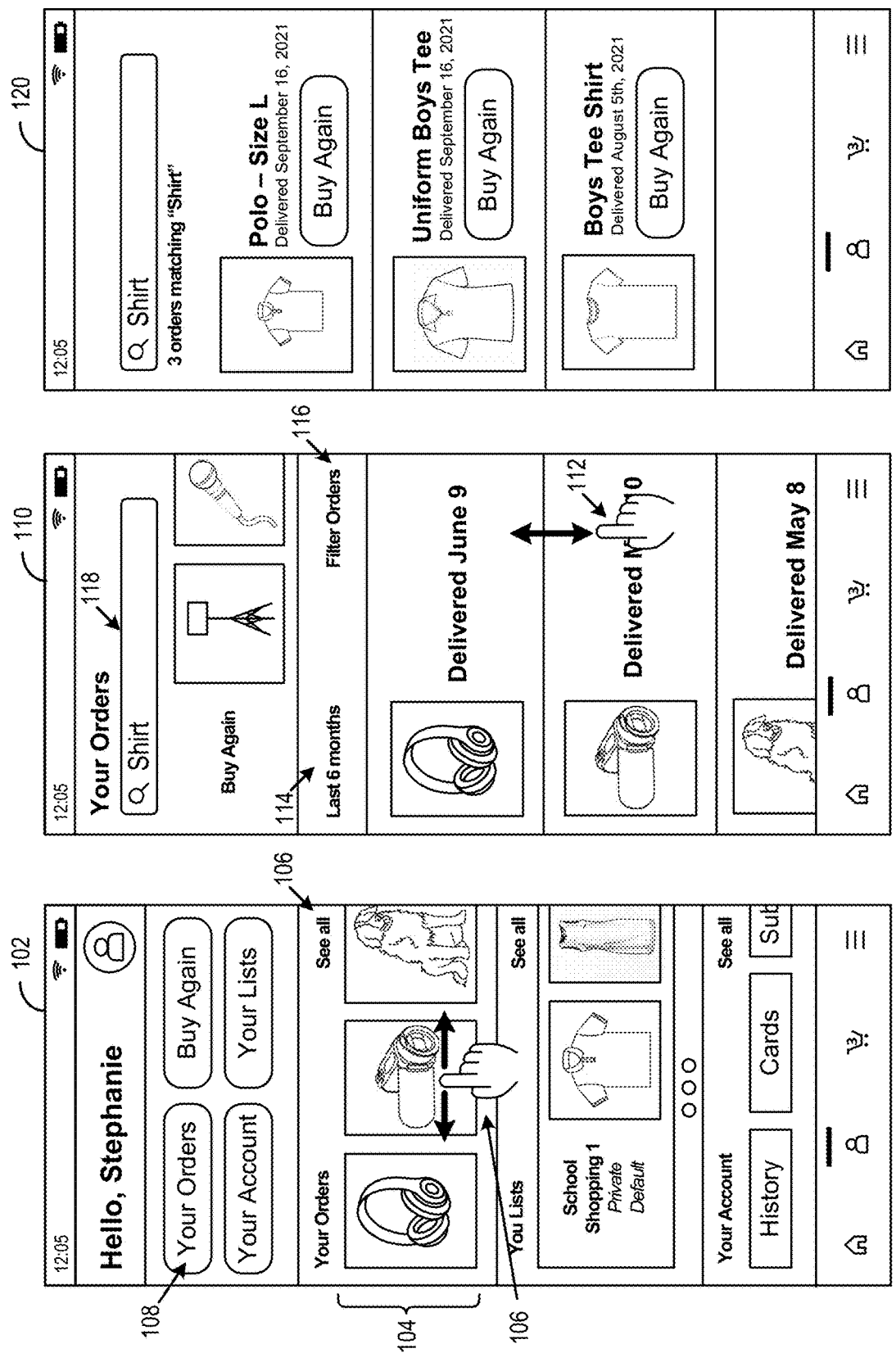
FIG. 1 depicts an example conventional process for performing a search.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. As used herein, an "item" refers to any suitable physical or intangible object (e.g., a shirt, a video game, a song, a movie, dog food, headphones, and the like) offered at an electronic catalog (e.g., a website offering various items for procurement).

Techniques described herein are directed to providing a user interface for searching a set of items (e.g., historically purchased items) via a carousel interface (referred to as a "carousel" for brevity). A carousel refers to a scrollable user interface, embedded within a network page, that is configured to present a subset of items of a larger set of items. A carousel optimizes screen space by displaying only a subset of items (e.g., the past ten purchased items) instead of the larger collection of items (e.g., all historically purchased items). In some embodiments, a carousel presents images of the subset of items. The particular subset of items presented via the carousel may be determined (e.g., using a predefined search query) according to a predefined set of criteria prior to presentation of the carousel such that the carousel immediately displays the subset of items (e.g., without user interaction). In some embodiments, the particular subset of items presented within the carousel may not be updated by user input (e.g., via filtering selections, via one or more search queries submitted by a user, etc.). Changes to the set of items (e.g., via subsequent purchases) may cause a different subset of items to be presented within the carousel.

Conventionally, when a user wished to find a past-purchased order or item, he could travel to a profile tab of a mobile application (e.g., a shopping application with which an electronic catalog can be browsed and items can be procured). Within the user's user profile page (e.g., a network page dedicated to providing information associated with the user's profile), a carousel was included that provided a number of most-recent orders (e.g., orders submitted in the last three months, six months, etc.). If the order and/or item the user was searching for was not readily apparent, or was not included in the carousel, the user would have to be savvy enough to identify that the carousel was a filtered set of his purchased orders and modify a filter set through various interface selections to cause additional items to be presented in the carousel. He would then have to continue scrolling through the carousel. This process could be repeated any number of times before the user would find the item and/or order. Alternatively, the user could make a selection at the interface to navigate away from his user profile page to a page dedicated to viewing and/or searching his previous orders. He could provide a search query and submit the search query to obtain search results including previously-purchased items obtained with his user profile that are relevant to the query. He could then scroll through the search results to find the item for which he was searching. In either scenario, the user faces an unnecessary amount of friction. This can lead to frustration and a negative user experience.

Techniques discussed herein are directed to providing a user interface element corresponding to search functionality within a carousel of items at the user's profile page (or at any suitable location). Although the carousel may present a subset of the items associated with the user profile (e.g., a top n most recently purchased items), the user may be afforded the ability to conduct a search of a larger collection of items (e.g., all previously-purchased items) from the carousel without being needlessly redirected to a separate network page. Due to limited display space on mobile applications, the UI element (e.g., a search bar) may be initially displayed in an expanded view (e.g., scrolled onto and atop the carousel) with text indicating its corresponding functionality (e.g., the text "search orders"). After a predetermined amount of time has elapsed (e.g., 1 second, 2 seconds, etc.), the UI element may be collapsed to provide a collapsed view in order to optimize space within the carousel. In the collapsed view, the UI element may include an icon (e.g., a magnifying glass) which may appear to be docked at one end of the carousel.

By clicking on the UI element, in either expanded or collapsed view, the carousel may be advanced/scrolled to an end of the carousel where the UI element may be provided in a static position (e.g., fixed position within the list) within the carousel (e.g., at a last entry of the carousel adjacent to a last item provided in the carousel). The user may provide and submit his query directly at the UI element without having to first navigate away from the carousel. Once submitted, the user may be navigated to another network page where he may be presented with the corresponding search results. Using these techniques, the user can be provided a set of most recent orders which may have a good likelihood of being of interest to the user, but if the item or order for which he is looking was not easily found, the user can more quickly access the information he seeks by performing a search directly from the carousel.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example conventional process for performing a search. FIG. 1 includes network page 102 (e.g., a webpage configured to display user profile information such as one or more past orders, one or more wish lists, account information, payment data, and the like). Network page 102 may be an example of a user profile page hosted by an electronic catalog provider. Network page 102 may be presented at a user device from within a mobile application.

Conventionally, network page 102 included carousel 104. The carousel 104 included entries corresponding to past orders (each order corresponding to one or more purchased items). These past orders were automatically filtered such that only orders initiated within the last six months were represented within carousel 104. If the user navigated through the carousel 104 and did not find the order for which he was searching, he would need to be savvy enough to recognize that the set of orders featured in the carousel 104 (e.g., the last ten orders) were not all of the orders he had made; that the list must be filtered in some way. With this knowledge, the user could select interface element 106 to navigate to a network page where he could view the entire set of past orders. Once selected, the user would be redirected to the network page 110 where the entire set of past orders could be viewed.

Additionally, or alternatively, the user could select option 108 to cause the application to navigate to a different network page (e.g., network page 110). The network page 110 is configured to present a list of orders in a vertically scrollable environment as indicated at 112. In network page 110, the list of orders may be filtered such that only orders initiated within the last six months were initially presented in the list. The user was provided an indication at 114 of the filtered nature of the list at 114. The user could similarly modify the filters using user interface element (e.g., a hyperlink) 116 to adjust the filters which in turn would adjust the particular orders included in the list. Alternatively, the user could submit a search query via search bar 118.

The search query obtained via search bar 118 would be performed and the network updated version of network page 110).

Thus, finding a particular item from a past order using the conventional interfaces included being navigated away from the user profile page which creates friction for the user experience as well as additional page requests to the server. In the filter example, the user would need to visit the filter page, select his filters, and then return to the carousel where he could once more scroll through looking for an order associated with the item he's looking for. In the search example, the user would need to navigate to the network page 110 in order to perform a search. Neither scenario is ideal given the additional network page loads as well as the number of selections the user must make to find the item for which he searches. Using conventional interface elements to obtain the desired information can be a tedious, frustrating, and potentially non-intuitive process. Improvements can be made to enable the user to find the desired information quicker and in a more-intuitive manner. These improvements are discussed below in connection with FIGS. 2-5.

Figure 2:
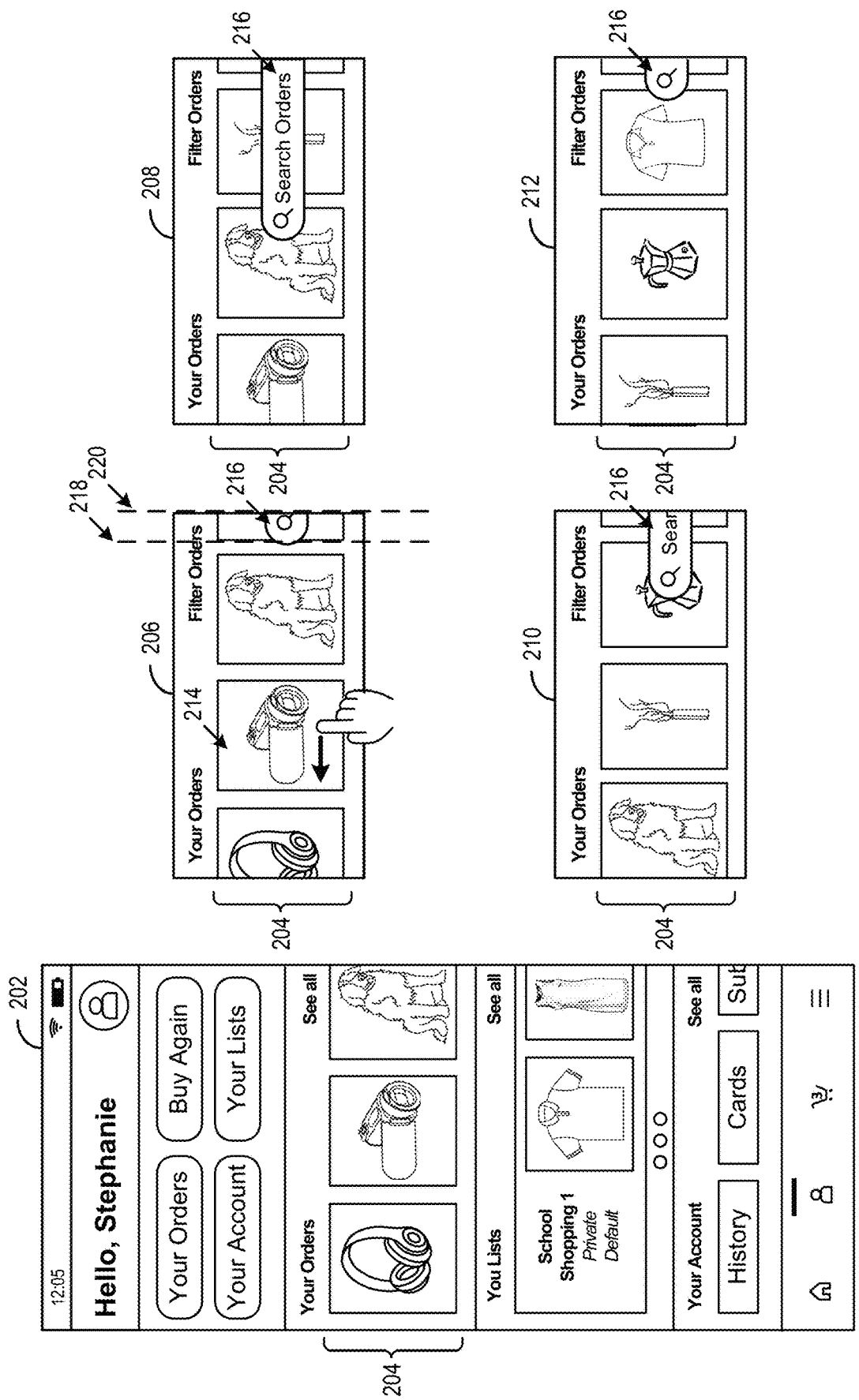
FIG. 2 is a schematic depicting example modifications to a user interface element corresponding to user input received at a carousel, in accordance with at least one embodiment.

FIG. 2 is a schematic depicting example modifications to a user interface element corresponding to user input received at a carousel, in accordance with at least one embodiment. Network page 202 (e.g., a user profile network page associated with a user profile and configured to present information associated with the user profile) includes improved user interfaces for identifying an order and/or an item from an order. Although examples herein may be provided in the context of a user profile network page, any suitable network page may be similarly utilized. Network page 202 may include carousel 204. Carousel 204 may include any suitable number of entries, each entry corresponding to an order, each order being associated with one or more items. In some embodiments In FIG. 2, each entry may depict an image of an item from the order. The number of entries included in the carousel 204 may differ depending on the use case. For example, the carousel 204 may include a number of entries corresponding to entries that are associated with a time period (within the last 3 months, the last 6 months, etc.), a most recent n entries, or the like. The carousel 204 may be horizontally scrollable such that the user may provide user input (e.g., dragging a finger, swiping a finger, etc.) to scroll through the entries in the carousel 204. In some embodiments, the entries in the carousel 204 may be non-circular, meaning the entries in the carousel 204 may be an ordered list of entries with a definite first entry and last entry. In some embodiments, the first entry may be a left-most entry of the carousel 204 while a last entry may be a right-most entry of the carousel 204, or vice versa.

It should be appreciated that, in some embodiments, any suitable number of images corresponding to any suitable number of items of an order may be depicted in a given entry of the carousel 204. Additionally, although examples throughout this disclosure utilize the context of looking for an item from a past order, it should be understood that the same or similar techniques may be utilized in other contexts, such as searching a carousel of items for a particular item (e.g., a particular previously-purchased item, a particular previously-viewed item, etc.) searching a carousel of user-defined lists, and the like. The examples utilized herein are not intended to limit the scope of this disclosure.

Carousel views 206-212 are intended to depict changes to the carousel made in response to user input provided at the carousel 204. Carousel view 206 depicts a view of the carousel 204 after the user begins dragging his finger to the left within the carousel 204. The entries of the carousel 204 (e.g., entry 214) may be shifted to the left in response to the user's input/dragging action. A swiping action in which the user swipes to the left could also cause a shift in the entries to the left as depicted in carousel view 206. Both actions of dragging or swiping a finger will be referred to herein as "scrolling" or individually "a scrolling action."

In response to receiving the scrolling action, a user interface (UI) element (e.g., UI element 216) may be made visible within the carousel 204. As depicted in carousel views 206-212, the UI element (e.g., UI element 216) may be, or may appear, overlaid atop the carousel (e.g., atop content of the carousel). Although the UI element 216 is depicted in the following examples as being positioned at the right side of the carousel 204, it should be appreciated that the UI element 216 may be positioned elsewhere within the carousel. In some embodiments, the UI element 216 may be made visible over time. By way of example, the UI element 216 may be scrolled (e.g., transitioned, moved, etc.) onto the carousel 204 such that a portion of the UI element 216 is initially visible as soon as the user begins to scroll through the carousel 204 as depicted in carousel view 206. The UI element 216 may continue to be scrolled onto the carousel 204 until the UI element 216 is fully visible as depicted in carousel view 206. When the UI element 216 is fully visible it can be referred to as being presented in an expanded form or an expanded view. UI element 216, as depicted within carousel view 208, is presented in an expanded form. The speed at which the UI element 216 is transitioned onto the carousel 204 may be predefined or similar/the same as the speed at which the scrolling action occurs.

Although this example initiates movement of the UI element 216 immediately upon receiving the scrolling action, it should be appreciated that other triggers may be used. By way of example, in some embodiments, the movement and/or appearance of the UI element 216 may be conditioned on a boundary of a nth entry of the carousel 204 being in view. For example, the movement of the UI element 216 may not be initiated until a left-most boundary 218 of a 4$^{th}$ entry of the list presented within the carousel 204 passes a right-most boundary 220 of the carousel 204.

In some embodiments, trigging the appearance of the UI element 216 in expanded form as depicted in carousel view 208 may be conditioned on any suitable condition. By way of example, presenting the expanded form of the UI element 216 may be triggered based on initially being at a beginning (or within a threshold of the beginning) of the list of entries presented within the carousel 204 and navigating away from that location.

Carousel view 210 depicts an additional transition/movement of the UI element 216 from being presented in expanded form as depicted in carousel view 208 to presenting the UI element 216 in a collapsed view as depicted in carousel view 212. In some embodiments, the expanded form of UI element 216 may be immediately replaced with the collapsed form of UI element 216 depicted in carousel view 212. If a transition/movement is used to transition from expanded form to collapsed form, the transition/movement may be triggered by a predefined condition. As a non-limiting example, the transition/movement may be triggered by a time-based condition such as a predefined time period (e.g., two seconds) elapsing after the UI element 216 was first presented in expanded form. As another example, a predefined boundary within the list of entries (e.g., a boundary of an entry e) may be utilized to trigger the transition/movement of UI element 216. By way of example, transitioning the UI element 216 may occur in response to a left-most boundary of a 6$^{th}$ entry of the list passes the right-most boundary 220 of the carousel 204. The speed at which the UI element 216 is transitioned from expanded to collapsed form may be predefined or similar/the same as the speed at which the scrolling action occurs.

When presented in expanded form, and as illustrated in carousel view 208, the UI element 216 may include text. In some embodiments, the text may indicate functionality associated with the UI element 216. In the example provided in FIG. 2, the UI element 216 includes the text "search orders" to indicate it can be utilized to perform a search of the user's past orders. When presented in collapsed form, and as illustrated in carousel view 212, the UI element 216 may lack any text but may include an image or icon such as, in this example, a magnifying glass to indicate the functionality associated with the UI element 216.

In some embodiments, the carousel 204 may include another version of the UI element at a last position within the list of entries (e.g., orders, items, etc.) presented within the carousel 204.

Figure 3:
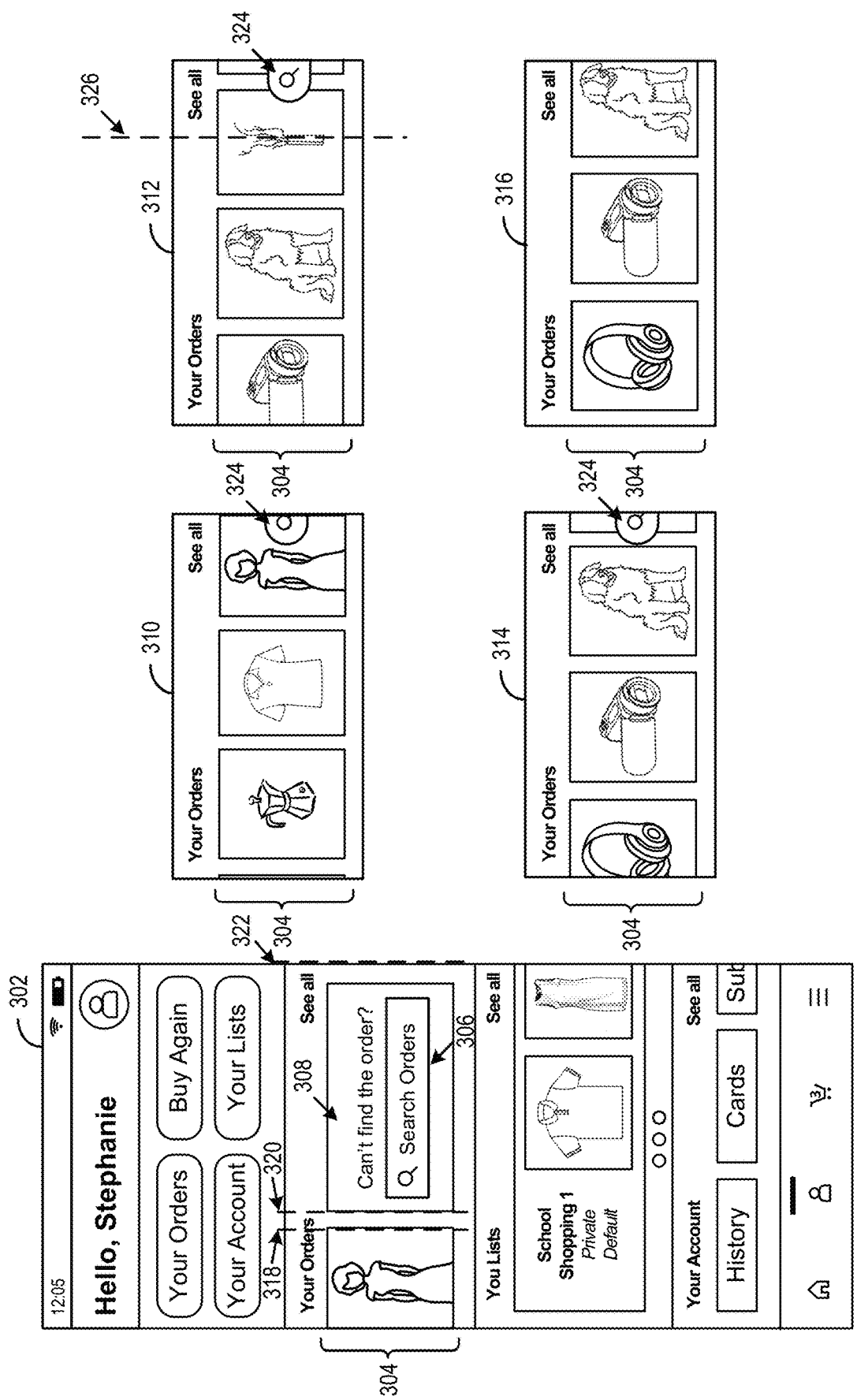
FIG. 3 is a schematic depicting example modifications to a user interface element corresponding to additional user input received at a carousel, in accordance with at least one embodiment.

FIG. 3 is a schematic depicting example modifications to a user interface element corresponding to additional user input received at a carousel, in accordance with at least one embodiment. Network page 302 is intended to be an example of the network page 202 of FIG. 2 and the carousel 304 is an example of the carousel 204 of FIG. 2. The particular content presented in carousel 304 of network page 302 is intended to depict a view of the carousel 204 of FIG. 2 once the user traverses to the end of the list. As described above, the UI element 306 (an example of the UI element 216 of FIG. 2) may be presented within a last entry 308 of the list presented by the carousel 304. In this manner, the UI element 306 may be statically-positioned at the end of the list presented by the carousel 304. Said another way, the position within the list at which the UI element 306 is presented may be fixed. UI element 306 may include a search bar (e.g., an edit box configured to receive text provided as user input) for submitting a search query. A search query submitted via UI element 306 may be utilized to search a greater collection of items than those depicted in the carousel 304. For example, in a use case in which the carousel 304 presents a subset of orders from the user's past orders, a search query submitted via the UI element 306 may search all of the user's past orders (or at least a set that includes more orders than those provided in the carousel 304). The UI element 306 may be in any suitable form.

In some embodiments, and as depicted in FIG. 3, the UI element 216 as presented in collapsed form within carousel view 212 of FIG. 2 may be removed and replaced with the UI element 306 as depicted in network page 302. In some embodiments, the removal of UI element 216 may be triggered based on traversing a predefined location of the list presented within carousel 304. By way of example, UI element 216 may be removed when a right-most boundary 318 of a second-to-last entry in the list or a left-most boundary 320 of the last entry 308 of the list is traversed (e.g., meets or passes boundary 322 of carousel 304. As another example, UI element 216 (as depicted in carousel 212) may be removed as right-most boundary 318 is traversed and UI element 306 may be presented as depicted in network page 302 when left-most boundary 320 is traversed.

Carousel views 310-316 are intended to depict changes to the carousel made in response to user input provided at the carousel 304. Carousel view 310 depicts a view of the carousel 304 after the user begins dragging his finger to the right within the carousel 304 after reaching an end of the carousel (indicated when a right-most boundary of the last entry 308 is visible). The entries of the carousel 304 may be shifted to the right in response to the user's input/dragging action.

In some embodiments, the UI element 324 (e.g., an example of the UI element 216 of FIG. 2) may be presented in collapsed form (e.g., similar to or the same as the collapsed form of UI element 216 as depicted in carousel view 212 of FIG. 2). Carousel view 310 is intended to depict a collapsed form of the UI element 324 as it transitions to being fully visible (depicted within carousel view 312). In some embodiments, the collapsed form and visibility of UI element 324 as presented in carousel view 312 may be the same the collapsed form and visibility of UI element 216 as depicted in carousel view 212. In some embodiments, the UI element 324 may simply appear initially as depicted in carousel view 312 without transitioning as described and depicted in carousel view 310.

In some embodiments, the boundaries 318 and/or 320 may be utilized to trigger the transition or appearance of the UI element 324. By way of example, the UI element 324 may begin transitioning onto the carousel 304 in response to the boundary 320 (or the boundary 318) once again traversing the boundary 322 as the entries of the list are scrolled to the right in response to the user's scrolling action. If no transition is used, the UI element 324 may simply appear as presented in carousel view 312 when the boundary 320 (or the boundary 318) is traversed. Boundaries 318 and 320, as used herein, are intended to be example boundaries only. The particular boundary and/or trigger for presenting the UI element 324 may differ. The speed at which the UI element 324 is transitioned onto the carousel 304 may be predefined or similar/the same as the speed at which the scrolling action occurs.

In some embodiments, as the user nears the beginning of the list, the UI element 324 may be transitioned from being provided in collapsed view to being removed altogether. By way of example, UI element 324 may be triggered to begin transitioning off the carousel 304 based at least in part on a traversing boundary 326 (e.g., when boundary 326 meets boundary 322, a right-most boundary of the carousel view). Boundary 326 (and any boundary described herein) may correspond to a boundary of one of the entries of the list, or the boundary 326 may be expressed as a distance from an end of the list of entries (e.g., a distance from the left-most boundary of the first entry in the list, or a distance from the right-most boundary of the last entry in the list). The speed at which the UI element 324 is transitioned off the carousel 304 may be predefined or similar/the same as the speed at which the scrolling action occurs. Carousel view 316 is intended to depict a view of the carousel after the UI element 324 has been removed due to the user being within a threshold to the beginning of the list.

Figure 4:
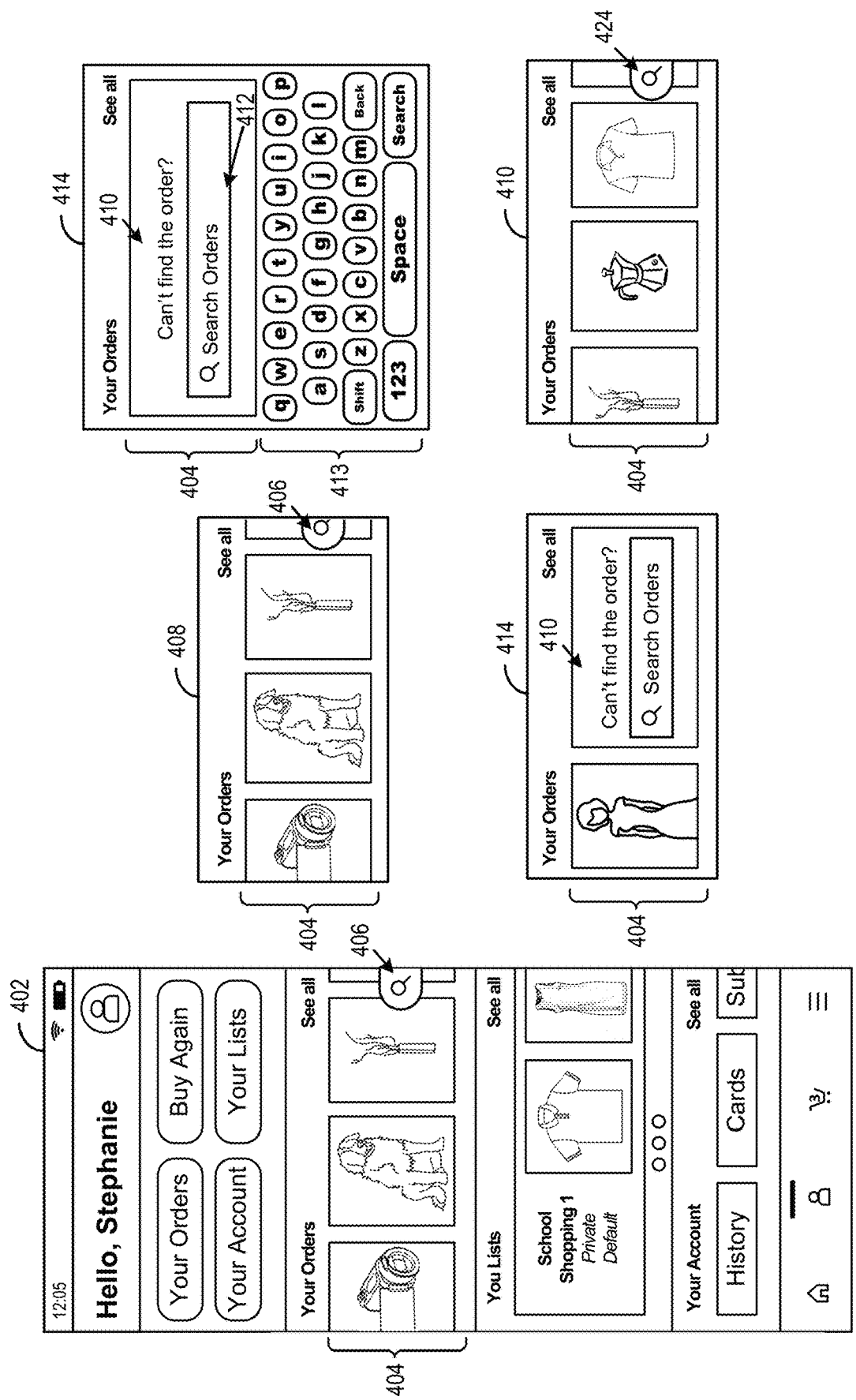
FIG. 4 is a schematic depicting example modifications to a user interface element based on user input received at a carousel, in accordance with at least one embodiment.

FIG. 4 is a schematic depicting example modifications to a user interface element based on user input received at a carousel, in accordance with at least one embodiment. Network page 402 is intended to be an example of the network pages 202 and 302 of FIGS. 2 and 3, respectively, and the carousel 404 is an example of the carousels 204 and 304 of FIGS. 2 and 3, respectively. The particular content presented in carousel 404 of network page 402 is intended to depict a view of the carousel 404 in which the UI element 406 (an example of the UI elements 216 and 324 of FIGS. 2 and 3, respectively) is presented in a collapsed form. The example of FIG. 4 may also be similarly applied to situations in which the UI element 406 is presented in expanded form (e.g., as presented in carousel view 208 of FIG. 2).

At any suitable time, the user may select (e.g., tap) the UI element 406. In response to selecting the UI element 406, the UI element 406 may be transitioned off the carousel 404 the carousel 404 may be navigated to the last entry of the list (e.g., last entry 308 of FIG. 3). Carousel view 408 is intended to depict the transition of the UI element 406 off the carousel 404 and the navigation of the carousel 404 to presenting last entry 410. Last entry 410 may include UI element 412, an example of the UI element 306 of FIG. 3. The last entry 410 may be presented in an extended form such that the last entry 410 is the only entry presented within the carousel 404. In some embodiments, the extended form of the last entry 410 is extended to fit a width of the carousel 404 as depicted in carousel view 414. In some embodiments, presentation of last entry 410 may trigger presentation of keyboard 413 to enable the user to enter a search query within UI element 412. In some embodiments, keyboard 413 and last entry 410 may be substantially the same width. Presentation of keyboard 413 may replace or cause other information of the network page 402 to be repositioned and/or removed from presentation while keyboard 413 is viewable.

Should the user change his mind and navigate away from the last entry 410 (e.g., by swiping to the right), the last entry 410 may be reduced in size (e.g., to a default size that is smaller than the extended size used when the last entry is presented in extended form) as depicted in carousel view 414.

Carousel view 416 is intended to depict the return of UI element 406 as the user continues to scroll within the carousel 404. Carousel view 416 corresponds with carousel view 212 of FIG. 2 in which the UI element 216 is presented in collapsed form (a collapsed view of the UI element 216.

Figure 5:
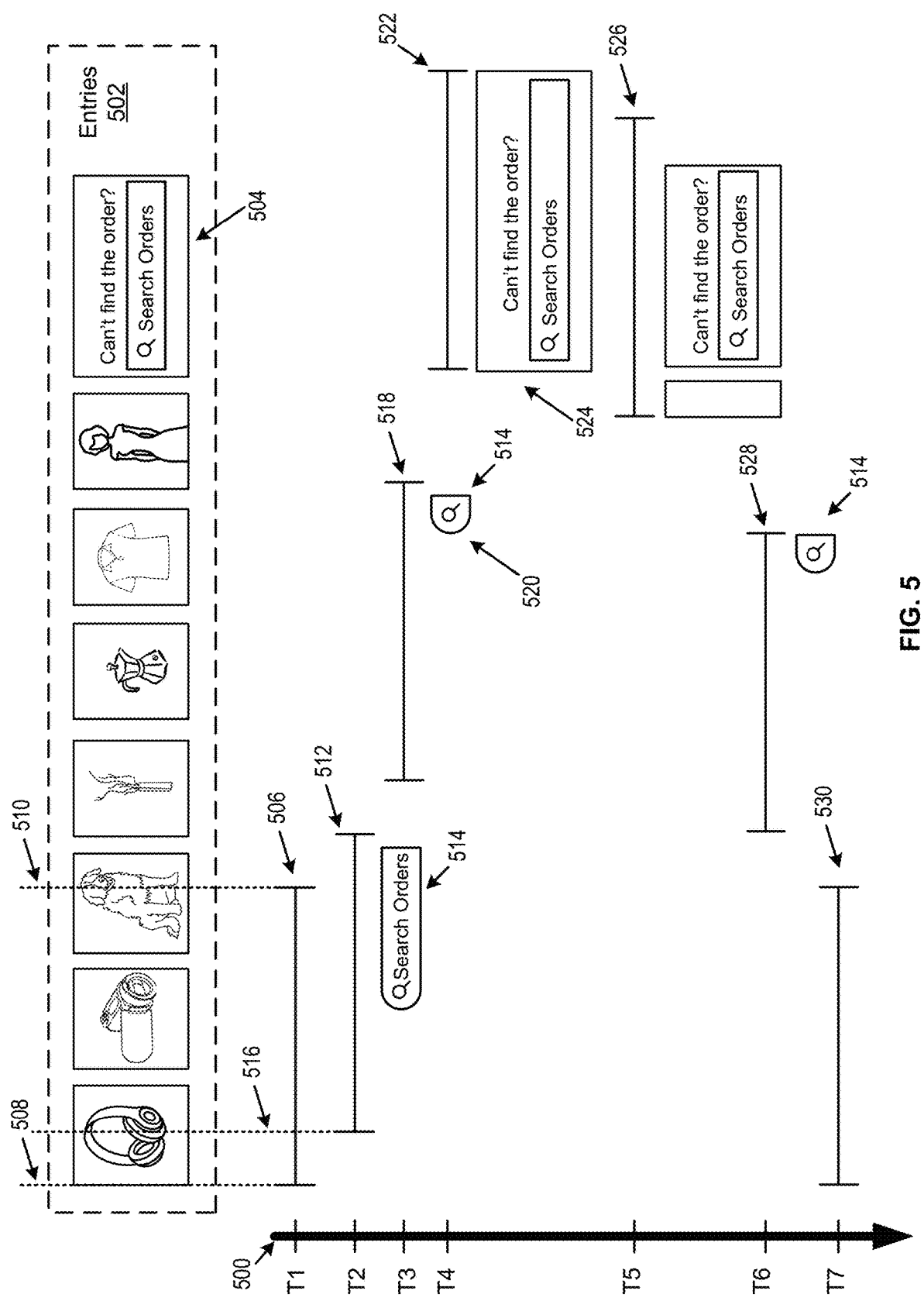
FIG. 5 depicts an example timeline illustrating navigation of a carousel and corresponding changes within the carousel to the presentation of a user interface element associated with search functionality, in accordance with at least one embodiment.

FIG. 5 depicts an example timeline 500 illustrating navigation of a carousel and corresponding changes within the carousel to the presentation of a user interface element associated with search functionality, in accordance with at least one embodiment. Entries 502 are intended to correspond to a subset of items (e.g., previously initiated orders, previously purchased items, etc.). In some embodiments, the entries 502 may include a statically-positioned UI element (e.g., the UI element of last entry 504, an example of the UI elements 306 and 412 of FIGS. 3 and 4, respectively). In some embodiments, the last entry 504 corresponding to the last entry of the entries 502 may be resizable such that the last entry 504 may appear in at least two sizes (e.g., a default size and an extended size). As depicted in FIG. 5 within entries 502, the last entry 504 is depicted in a default size (e.g., a first size).

Indicator 506 is intended to specify a portion of the entries 502 that may be visible within the carousel at time T1. For example, a portion of three entries between boundaries 508 and 510 may be visible via a carousel as indicated by indicator 506 at T1.

At time T2, a focus of the carousel may shift to the right (e.g., the boundaries 508 and 510 may shift to those indicated by indicator 512) based on user input (e.g., a scrolling action received at the user device). In some embodiments, upon initiating the scrolling action, the UI element 514 (an example of the UI element 216 of FIG. 2) may become visible within the carousel. In some embodiments, the UI element 514 may be instantly and fully visible, without transitioning onto the carousel. In other embodiments, the UI element 514 may move onto the carousel in increasing increments until fully displayed as depicted in FIG. 5. In some embodiments, visibility of the UI element 514 may instead be triggered when a predefined threshold (e.g., boundary 516). As depicted in relation to time T2, the UI element 514 is depicted in an expanded form (or presented in an expanded view).

At time T3, a focus of the carousel may shift to the right (e.g., the boundaries 508 and 510 may shift to those indicated by indicator 518) based on user input (e.g., the same or different scrolling action received at time T2). Additionally, the UI element 514 may transition to presenting a collapsed form (a collapsed view) of the UI element 514. In some embodiments, the transition of UI element 514 from an expanded form to a collapsed form may be initiated based on a threshold distance traveled within the carousel, a predefined boundary (e.g., a boundary of one of the entries of entries 502), or based on time. By way of example, the transition of UI element 514 from expanded to collapsed form may be initiated based on a predefined period of time (e.g., 2 second, 1.5 seconds, etc.) from when the UI element 514 was first presented in expanded form. Thus, in some embodiments, T3 is at least the predefined time period later than T2.

At time T4, the user may select the UI element 514 as depicted at 520. In response to selection, the focus of the carousel (e.g., the area between boundaries 508 and 510) may shift again to the right until the last entry 504 is presented as indicated by the indicator 522. In some embodiments, at this position, the last entry 504 may be presented at (or resized to) a predefined extended size that is larger than the default size for the last entry 504. In some embodiments, the extended size of the last entry 504 may be equal to, or within a threshold difference of, a width of the carousel such that the last entry 504 occupies the entire, or substantially the entire, width of the carousel.

At time T5, a focus of the carousel may shift to the left (e.g., the boundaries 508 and 510 may shift to those indicated by indicator 526) based on user input (e.g., a scrolling action received at the user device). In response to the user input, the last entry 504 may be resized to the default size, the default size being smaller than the size of the last entry 504 as depicted at 524.

At time T6, a focus of the carousel may continue to shift to the left (e.g., the boundaries 508 and 510 may shift to those indicated by indicator 528) based on user input (e.g., the same or different scrolling action received at time T5). At time T6, the UI element 514 may be once again presented in collapsed form. The UI element 514 may transition as if moving from outside the carousel until a whole of the UI element 514 (a collapsed form of the UI element 514) is presented within the carousel.

At time T7, a focus of the carousel may continue to shift to the left (e.g., the boundaries 508 and 510 may shift to those indicated by indicator 530, the beginning of the entries 502) based on user input (e.g., the same or different scrolling action received at time T5). Upon reaching the beginning of the entries 502 as indicated by indicator 530, the UI element 514 may be transitioned off (or instantly removed from) the carousel such that no version of the UI element is visible when the focus of the carousel corresponds to the indicator 530.

Figure 6:
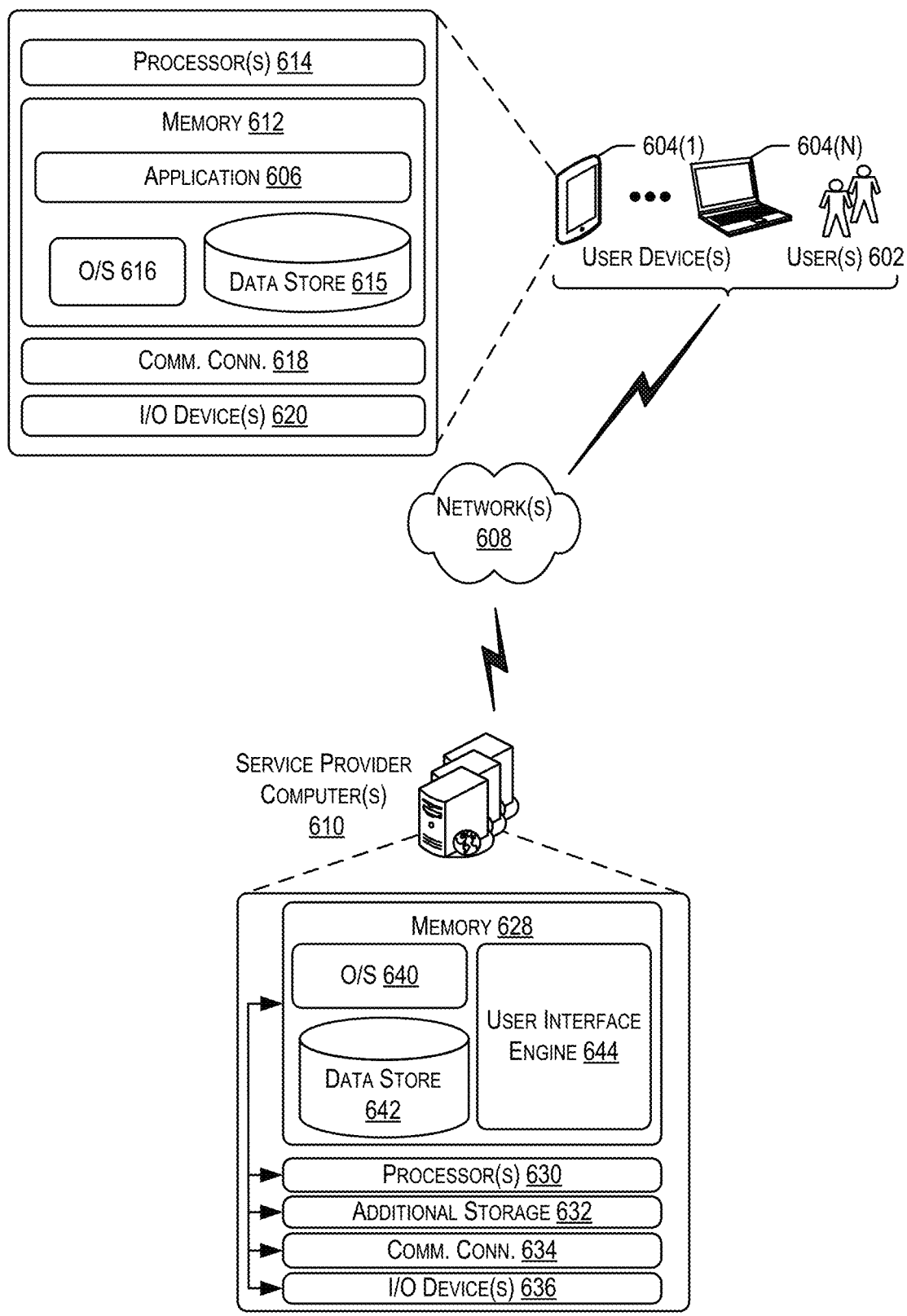
FIG. 6 illustrates components of a system according to a particular embodiment.

FIG. 6 illustrates components of a system 600 according to a particular embodiment. In system 600, one or more users 602 may utilize a user device (e.g., a user device of a collection of user devices 604(1)-(N) (collectively, user devices 604). For example, the users 602 may access a user interface accessible through an application 606 (e.g., a web browser, an application configured to render user interfaces provided by the user interface engine 644) running on the user devices 604 via one or more networks 608. In some aspects, the application 606 operating on the user devices 604 may provide content that can be hosted, managed, and/or provided by a computing resources service or service provider, such as by utilizing one or more service provider computer(s) 610. The users 602 may be provided various graphical user interface elements such as those described in connection to the figures above. In some embodiments, user input provided via these user interfaces may be transmitted by the application 606 to the user interface engine 644, operating as part of service provider computer(s) 610.

In some examples, the networks 608 may include any one or a combination of many different types of networks, such as cable networks, the Internet, wireless networks, cellular networks, and other private and/or public networks. While the illustrated example represents the users 602 accessing application functionality over the networks 608, the described techniques may equally apply in instances where the users 602 interact with the service provider computer(s) 610 via the one or more user devices 604 over a landline phone, via a kiosk, or in any other suitable manner. It should be appreciated that the described techniques may apply in other client/server arrangements, as well as in non-client/server arrangements (e.g., locally stored applications, etc.).

The service provider computer(s) 610, perhaps arranged in a cluster of servers or as a server farm, may host the application 606 operating on the user devices 604 and/or cloud-based software services. Other server architectures may also be used to host the application 606 and/or cloud-based software services. The application 606 (e.g., a shopping application, a web browser, etc.) operating on the user devices 604 may be capable of handling requests from the users 602 and serving, in response, various user interfaces (e.g., the user interfaces of FIGS. 2-5) that can be rendered at the user devices 604.

The user devices 604 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 604 may be in communication with the service provider computer(s) 610 via the networks 608, or via other network connections.

In one illustrative configuration, the user devices 604 may include at least one memory 612 and one or more processing units (e.g., processor(s) 614). The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. Depending on the configuration and type of user computing device, the memory 612 may be volatile (such as random access memory (RAM)) and/or non-volatile (such as read-only memory (ROM), flash memory, etc.). The user devices 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random access memory (SRAM), dynamic random access memory (DRAM), or ROM.

Turning to the contents of the memory 612 in more detail, the memory 612 may include an operating system 616, one or more data stores 615, and one or more application programs, modules, or services for implementing the techniques disclosed herein, provided via the application 606. The application 606 may be configured to receive, store, and/or display a network page or other interface for interacting with the service provider computer(s) 610. Additionally, the memory 612 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 604 may also contain communications connection(s) 618 that allow the user devices 604 to communicate with a stored database, another computing device or server (e.g., the service provider computer(s) 610), user terminals and/or other devices on the networks 608. The user devices 604 may also include I/O device(s) 620, such as a keyboard, a mouse, a pen, a voice input device, a touch input device, a display, speakers, a printer, etc.

In some aspects, the service provider computer(s) 610 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 610 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 610 may be in communication with the user devices 604 and/or other service providers via the networks 608 or via other network connections. The service provider computer(s) 610 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 610 may include at least one memory 628 and one or more processing units (e.g., processor(s) 630). The processor(s) 630 may be implemented as appropriate in hardware, computer-executable instructions, firmware, or combinations thereof. Computer-executable instruction or firmware implementations of the processor(s) 630 may include computer-executable or machine-executable instructions written in any suitable programming language to perform the various functions described.

The memory 628 may store program instructions that are loadable and executable on the processor(s) 630, as well as data generated during the execution of these programs. Depending on the configuration and type of service provider computer(s) 610, the memory 628 may be volatile (such as RAM) and/or non-volatile (such as ROM, flash memory, etc.). The service provider computer(s) 610 or servers may also include additional storage 632, which may include removable storage and/or non-removable storage. The additional storage 632 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 628 may include multiple different types of memory, such as SRAM, DRAM, or ROM.

The memory 628, the additional storage 632, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 628 and the additional storage 632 are all examples of computer storage media. Additional types of computer storage media that may be present in the service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 610. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 610 may also contain communications connection(s) 634 that allow the service provider computer(s) 610 to communicate with a stored database, another computing device or server, user terminals and/or other devices on the networks 608. The service provider computer(s) 610 may also include I/O device(s) 636, such as a keyboard, a mouse, a pen, a voice input device, a touch input device, a display, speakers, a printer, etc.

Turning to the contents of the memory 628 in more detail, the memory 628 may include an operating system 640, one or more data stores 642, and/or one or more application programs, modules, or services (e.g., the user interface engine 644) for implementing the features disclosed herein.

Figure 7:
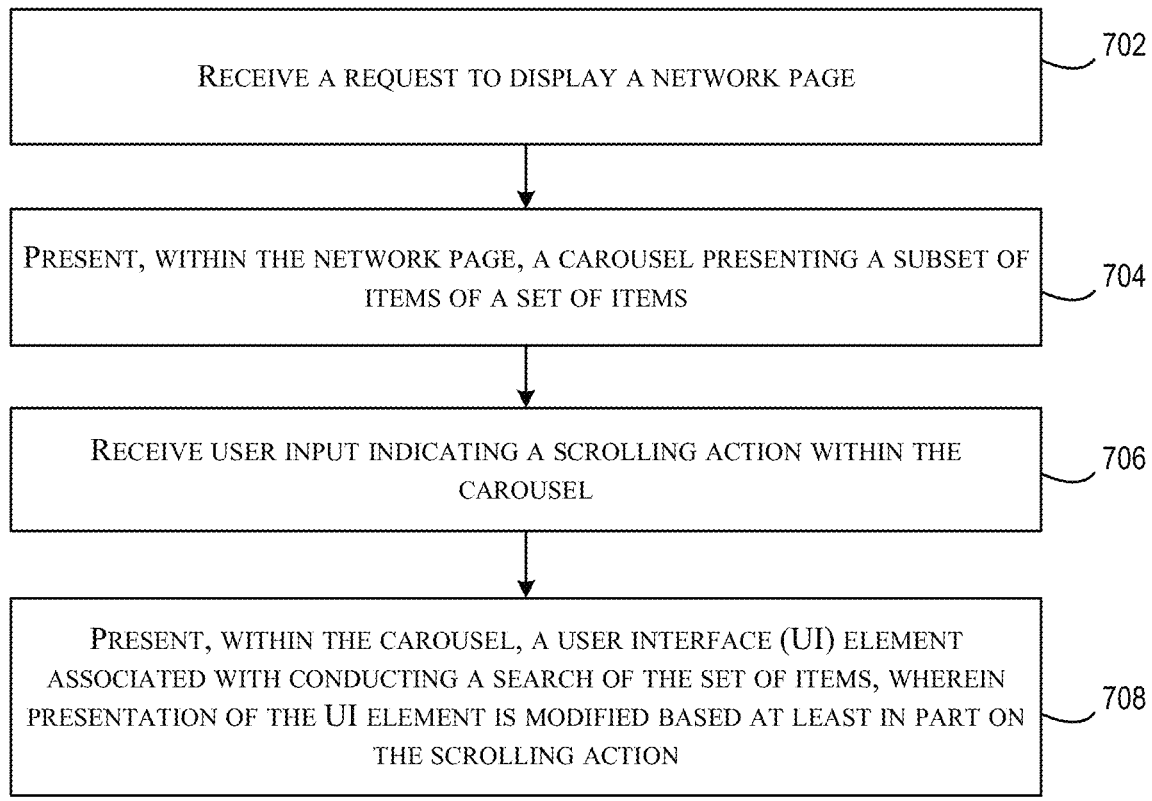
FIG. 7 is a flowchart illustrating an example method for providing a user interface element associated with search functionality from within a carousel at a user profile network page, in accordance with at least one embodiment.

FIG. 7 is a flowchart illustrating an example method 1700 for providing a user interface element associated with search functionality from within a carousel at a user profile network page, in accordance with at least one embodiment. A computing device comprising one or more processors and one or more computer-readable mediums (e.g., one or more memories) may be utilized. A computer-readable medium may store computer-executable instructions that, when executed by at least one processor, cause at least one computer to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by any suitable combination of one or more of the user devices 604 of FIG. 6 and/or the service provider computer(s) 610 of FIG. 6.

The method 700 may begin at 702, where a request to display a network page (e.g., a user profile page such as network pages 202, 302, and/or 402 of FIGS. 2-4, respectively) is received. In some embodiments, the network page may be configured to present information associated with a user profile. In some embodiments, the user profile may be managed by an electronic catalog provider, where the electronic catalog presents any suitable number of items that are available for procurement.

At 704, a carousel (e.g., the carousels 204, 304, and/or 404 of FIGS. 2-4, respectively) may be presented within the network page. In some embodiments, the carousel presents a subset of items of a set of items associated with a user profile. As a non-limiting example, the carousel could present images of items corresponding to one or more past orders (e.g., the last ten orders, the orders from the past six months, etc.). As another example, the carousel could present any suitable number of previously-purchased items. As yet another example, the carousel could present any suitable number of previously-viewed items. It should be appreciated that, in some embodiments, the subset of item presented via the carousel may be, or may not be, associated with a user profile.

At 706, user input (e.g., a dragging action, a swiping action, a selection of a navigational interface such as a button, etc.) may be received. The user input may indicate a scrolling action within the carousel.

At 708, a user interface (UI) element (e.g., the UI elements 216, 324, and/or 412 of FIGS. 2-4, respectively) may be presented within the carousel. In some embodiments, the UI element may be associated with conducting a search of the set of items. For example, in a use case in which a number of past orders is presented within the carousel, the search can be conducted against a larger set of past orders (e.g., all past orders associated with the user profile). In some embodiments, the UI element is modified based at least in part on the scrolling action. By way of example, any of the transitions and/or replacements described above in connection with the UI elements of FIGS. 2-5 may be performed based at least in part on the scrolling action received.

Figure 8:
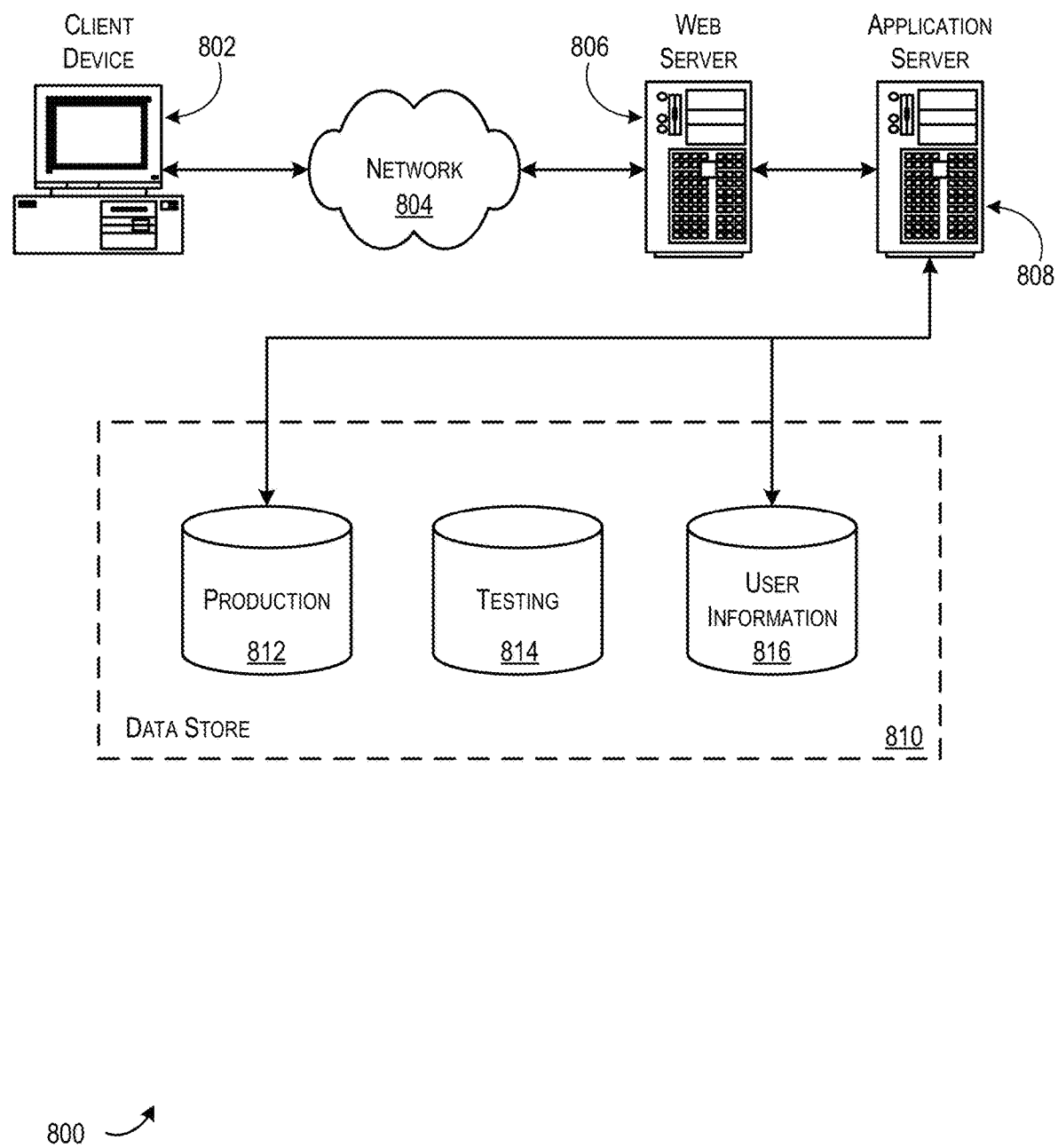
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes a user device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Webpage that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing device, a request to display a user profile network page corresponding to a user profile associated with an electronic catalog provider;
   presenting, within the user profile network page, a carousel presenting a subset of items of a set of items;
   receiving user input indicating a scrolling action within the carousel;
   in response to receiving the user input, presenting, within the carousel, a user interface (UI) element associated with search functionality, the UI element being presented in an expanded form, wherein the UI element associated with the search functionality is overlaid atop the carousel;
   presenting the UI element in a collapsed form overlaid atop the carousel based at least in part on a predefined period of time elapsing since the UI element was presented in expanded form;
   receiving subsequent user input indicating selection of the UI element in the collapsed form;
   in response to receiving the subsequent user input, navigating the carousel to a last entry of the carousel, the last entry comprising a statically-positioned presentation of the UI element associated with search functionality;
   receiving a search query at the UI element;
   executing the search query against the set of items associated with the user profile, the set of items comprising the subset of item presented at the carousel; and
   navigating to a second network page that presents search results corresponding to the search query.

2. The computer-implemented method of claim 1, wherein the carousel is horizontally scrollable.

3. The computer-implemented method of claim 1, further comprising:
   receiving additional user input indicating an additional scrolling action, wherein the additional scrolling action is associated with returning to a beginning portion of the carousel; and
   removing the UI element in the collapsed form from the carousel in response to the additional user input.

4. The computer-implemented method of claim 1, further comprising:
   presenting the last entry in the expanded form based at least in part on the subsequent user input;
   receiving additional user input indicating an additional scrolling action, wherein the additional scrolling action is associated with navigating away from the last entry; and
   presenting the last entry in a corresponding collapsed form based at least in part on the additional user input.

5. A computing device, comprising
   one or more processors; and
   one or more memories comprising computer-executable instructions that, when executed by the one or more processors, cause the computing device to:
   receive a request to display a network page;
   present, within the network page, a carousel presenting a subset of items of a set of items;
   receive user input indicating a scrolling action within the carousel; and
   present, within the carousel, a user interface (UI) element that, while presented in an expanded form, is configured to receive text corresponding to a search query for conducting a search of the set of items, wherein presentation of the UI element is modified based at least in part on the scrolling action.

6. The computing device of claim 5, wherein presenting the UI element comprises scrolling the UI element onto the carousel.

7. The computing device of claim 6, wherein the UI element is scrolled at a different speed from a speed used for the scrolling action.

8. The computing device of claim 5, wherein executing the computer-executable instructions further causes the computing device to transition from presenting the UI element in the expanded view to presenting the UI element in a collapsed view based at least in part on a predefined period of time elapsing since the UI element was presented in the expanded view.

9. The computing device of claim 8, wherein executing the computer-executable instructions further causes the computing device to:
receive subsequent user input indicating selection of the UI element presented in the collapsed view; and
in response to receiving the subsequent user input indicating selection of the UI element presented in the collapsed view, navigate the carousel to a last entry of the carousel, the last entry comprising a statically-positioned presentation of the UI element as presented in the expanded view.

10. The computing device of claim 8, wherein executing the computer-executable instructions further causes the computing device to:
receive subsequent user input indicating scrolling of the carousel has reached a last entry; and
remove the UI element presented in the collapsed view from being overlaid atop the carousel.

11. The computing device of claim 10, wherein the last entry of the carousel comprises a different view of the UI element.

12. The computing device of claim 5, wherein executing the computer-executable instructions further causes the computing device to:
receive a subsequent search query at the UI element while the UI element is presented in the expanded view;
execute the subsequent search query against the set of items; and
navigate to a second network page that presents a set of search results corresponding to the search query.

13. The computing device of claim 5, wherein the subset of items are selected from the set of items for presentation in the carousel based at least in part on respective dates and times associated with each of the set of items.

14. A non-transitory computer-readable storage medium comprising one or more memories storing computer-executable instructions that, when executed by one or more processors of a computing device, cause the computing device to:
receive a request to display a network page;
present, within the network page, a carousel presenting a subset of items of a set of items;
receive user input indicating a scrolling action within the carousel;
present, within the carousel, a user interface (UI) element associated with conducting a search atop at least a portion of the carousel, the UI element being presented in an expanded view in response to receiving the scrolling action; and
in response to a period of time elapsing since the UI element was presented in the expanded view, present the UI element in a collapsed view.

15. The non-transitory computer-readable storage medium of claim 14, wherein the UI element as presented in the expanded view includes text, and wherein the UI element as presented in the collapsed view lacks text.

16. The non-transitory computer-readable storage medium of claim 14, wherein the carousel comprises a statically-positioned representation of the UI element at one end of the carousel.

17. The non-transitory computer-readable storage medium of claim 16, wherein selecting the UI element in the expanded view or the collapsed view navigates a focus point of the carousel to the statically-positioned representation of the UI element.

18. The non-transitory computer-readable storage medium of claim 14, wherein executing the computer-executable instructions further causes the computing device to:
receive a search query at the UI element; and
execute the search query against the set of items.

19. The non-transitory computer-readable storage medium of claim 14, wherein the set of items are items that have been historically ordered using a user profile.

20. The non-transitory computer-readable storage medium of claim 14, wherein an entry of the carousel comprises an image of an item of the subset of items.

* * * * *